WELLER & HATCHER.
Manufacture of Sugar.
No. 51,502. Patented Dec. 12, 1865.
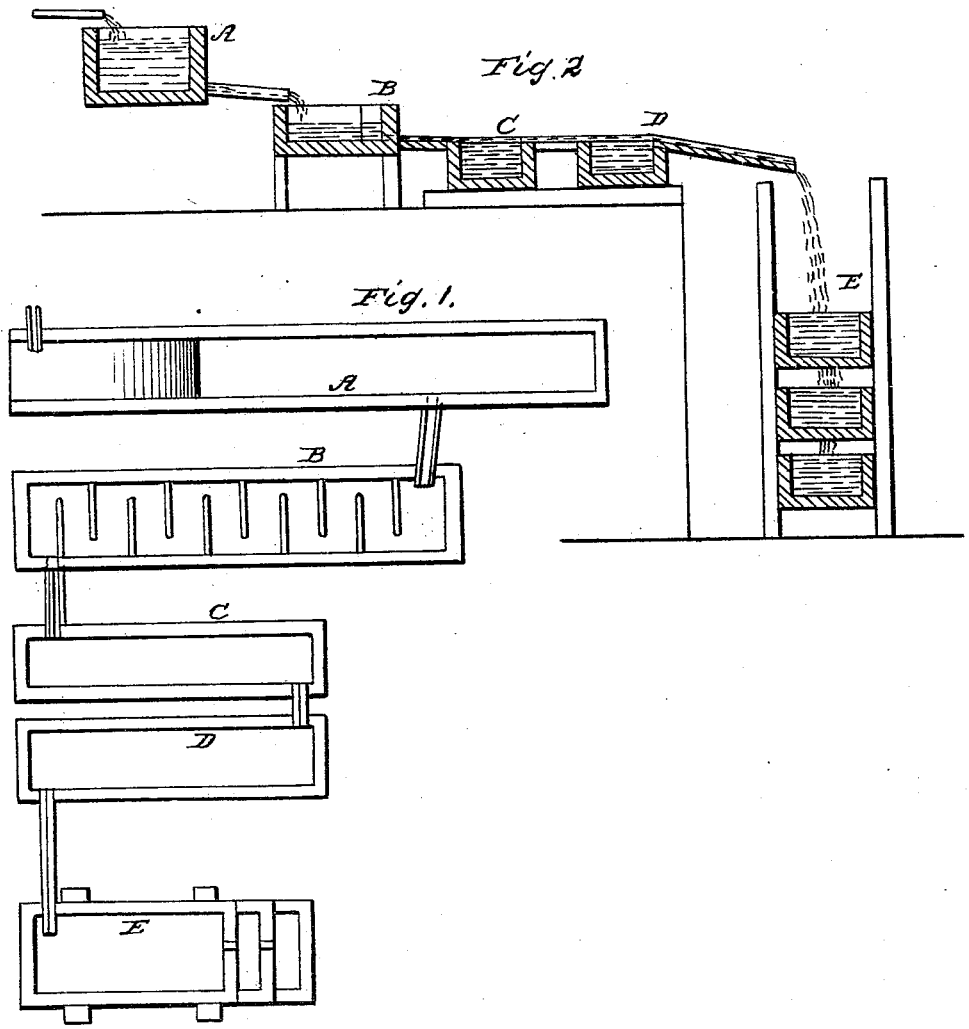

UNITED STATES PATENT OFFICE.

H. WELLER AND J. E. HATCHER, OF FULTONHAM, OHIO.

IMPROVEMENT IN THE MANUFACTURE OF SUGAR.

Specification forming part of Letters Patent No. 51,502, dated December 12, 1865.

*To all whom it may concern:*

Be it known that we, H. WELLER and J. E. HATCHER, of Fultonham, Muskingum county, and State of Ohio, have invented a new and useful Improvement in the Manufacture of Sugar; and we do hereby declare that the following is a full, clear, and exact description thereof, which will enable those skilled in the art to make use the same, reference being had to the accompanying drawings, forming part of this specification, in which—

Figure 1 represents a plan or top view of this invention. Fig. 2 is a longitudinal vertical section of the same.

Similar letters of reference indicate corresponding parts.

This invention consists in separating the gum from the sirup by passing the same, as it leaves the evaporator, through a series of coolers and granulating-boxes in such a manner that the gum is caused to precipitate on the bottoms of the coolers and is effectually prevented from entering into the sugar, and that the sirup, after it has passed from the evaporator through the coolers into the granulating-boxes, is ready for draining in nine or ten days, without requiring any further labor and without the treatment with chemicals.

In carrying out our process we press out the juice and pass it into a vat, A, thence into an evaporator, B, of any suitable construction, and boil and skim the juice in the ordinary manner until it is of the proper consistency for granulating, which stage is indicated by the sirup becoming of a bright golden color and by bubbles rising from the sirup and bursting on its surface, with the emission of little jets or puffs of steam. When the sirup has attained the proper consistency it is conducted from the boiler through a spout gradually into a box or cooler, C, which is placed in a slightly-inclined position, so that the sirup, which is let in at its high end, descends gradually to the lowest end, whence it flows into a similar box or cooler, D, which is of a similar construction, but inclined in an opposite direction to the box C. On discharging from the cooler D the sirup is received into the granulating-boxes E, as shown in Fig. 2.

While passing through the coolers C D, which are at least ten feet long for an ordinary evaporator and about twelve inches deep, (more or less,) the sirup is divested from all the gum retained by the same, said gum being precipitated on the bottoms of the coolers and prevented effectually from entering the granulating-boxes. We are thereby enabled to drain or dry the sugar, without the aid of water or chemicals, simply by pressure, and the process of manufacturing sugar, particularly from sorghum, is much facilitated.

We claim as new and desire to secure by Letters Patent—

1. Passing the sirup, as the same leaves the evaporator or boiler, through a series of boxes or coolers, substantially as herein described, so that it is divested of the gum mixed with it previous to its admission to the granulating-boxes.

2. The combination and arrangement of the evaporator B, coolers C D, (one or more,) and granulating-boxes E, substantially as and for the purpose set forth.

The above specification of our invention signed by us this 20th day of October, 1865.

H. WELLER.
J. E. HATCHER.

Witnesses:
J. D. FANLEY,
I. D. AXLINE.